United States Patent [19]

Lockwood

[11] 3,841,517

[45] Oct. 15, 1974

[54] RECEPTACLE AND PLUG

[75] Inventor: John C. Lockwood, Atlanta, Ga.

[73] Assignee: Scripto, Inc., Atlanta, Ga.

[22] Filed: Sept. 4, 1973

[21] Appl. No.: 394,082

[52] U.S. Cl............................... 220/40 R, 220/42 B
[51] Int. Cl........................................... B65d 41/05
[58] Field of Search............... 220/40 R, 42 B, 24.5; 215/357

[56] References Cited
UNITED STATES PATENTS

| | | | |
|---|---|---|---|
| 2,585,233 | 2/1952 | Dzus | 220/40 R |
| 3,661,291 | 5/1972 | Hetzer | 220/42 B |

*Primary Examiner*—George T. Hall
*Attorney, Agent, or Firm*—Newton, Hopkins & Ormsby

[57] ABSTRACT

A receptacle and manually removable plug is disclosed wherein the receptacle comprises a body having a substantially cylindrical chamber extending from an orifice in an external surface of the body, and with the walls of the chamber having one or more helical ramps facing the orifice. The removable plug comprises a head and a stem with the surface of the stem having one or more helical ramps facing away from the plug head and adapted to be rotatably slid upon the chamber helical ramps upon insertion of the plug stem into the receptacle chamber. Frictional engagement means are also provided for holding the plug in the receptacle upon insertion therewithin.

12 Claims, 9 Drawing Figures

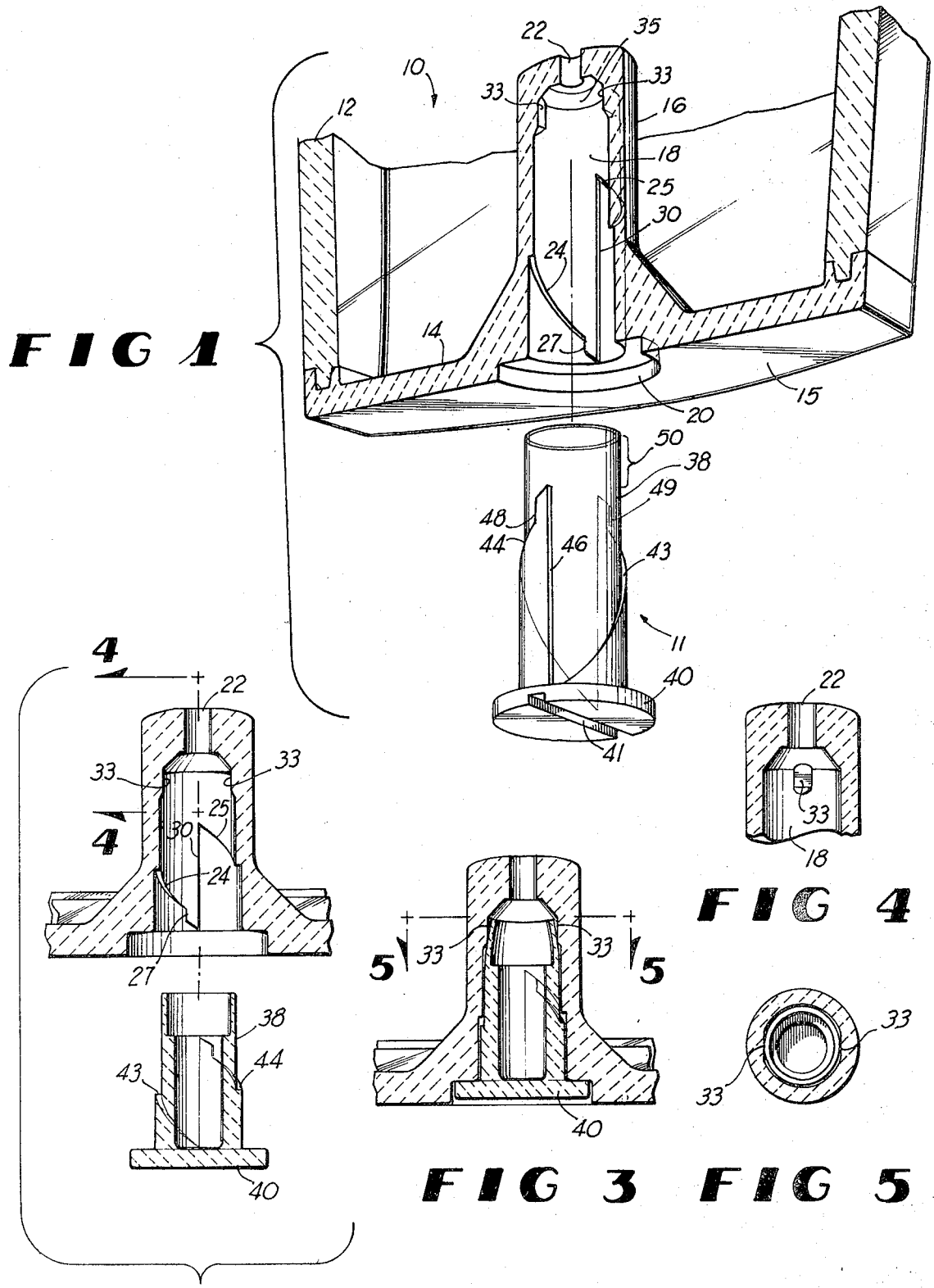

RECEPTACLE AND PLUG

BACKGROUND OF THE INVENTION

This invention relates generally to receptacles and plugs, and more specifically to receptacles and removable plugs of small sizes such as those manipulatable by the use of human fingertips.

Many structures today include receptacles, chambers and the like which communicate to orifices formed in external surfaces of the structures. Frequently, it is desirable to plug or otherwise cover such an orifice or a portion of the receptacle in communication therewith. Perhaps the most prevelant manner in which this has been heretofore accomplished has been through the use of screws which are threaded into female threads formed upon the interior walls of the receptacles. The use of screws has, however, presented several problems. Firstly, the male threads of the screws must be rotatably aligned with the female threads of the receptacle in order to commence threading. Secondly, very small screws are difficult to rotate with the use of human fingertips thereby rendering desirable the use of a tool such as a screwdriver or thin coin. Thirdly, once the screws are firmly seated within the receptacle, they are held tightly in place therewithin by means of compressive forces exerted between the screw and receptacle threads in an axial direction. As these compressive forces exist along the entire length of the screws, the forces resisting removal of the screws from the receptacles are relatively substantial. This resistance further renders the use of an ancillary tool such as a screwdriver or coin desirable in removal operation.

Where threaded receptacles and screw type plugs are formed of metal, they must ordinarily be machined, which process is relatively costly. Where made of plastic, the female threads of the receptacle must ordinarily be formed by the use of a rotating core, mandrel or the like, and the male threads of the screw formed by the use of split molds. These techniques are also costly.

Other types of receptacles and removable plug combinations have heretofore been devised, but have not proven to be economical in manufacture. One example of such other types is that of a cylindrical, relatively smooth surfaced receptacle and cylindrical plug having one or more radially projecting lugs which are insertable through registered indentures at the receptacle entrance or orifice. Once these lugs are inserted through the indentures the plug may be depressed against spring biasing means and rotated causing the lugs to be positioned beneath, and biased against a ledge extending between the indentures. The need here for spring biasing means, of course, necessitates the relatively costly inclusion of an additional component.

Accordingly, it is a general object of the present invention to provide an improved receptacle and removable plug.

More specifically, it is an object of the present invention to provide a receptacle and a removable plug of relatively small size which may be manually inserted, held firmly within, and manually removed from the receptacle with facility.

Another object of the invention is to provide a receptacle and removable plug each of which may be manufactured in an economical manner.

Another object of the invention is to provide a non-metallic receptacle and removable plug which may be manufactured without the use of split molding or rotating core techniques.

Yet another object of the invention is to provide a plug which may be inserted into a receptacle without angularly aligning the plug with respect to the receptacle orifice.

Still another object of the invention is to provide a receptacle and removable plug which does not require the use of screw threads on the surface of either the receptacle or plug.

Another object of the invention is to provide a receptacle and removable plug with means inhibiting the plug from being overly tightened within the receptacle.

SUMMARY OF THE INVENTION

In one form of the invention, a receptacle and a removable plug is provided wherein the receptacle comprises a body having a substantially cylindrical chamber extending from a orifice in an external surface of the body, and with the walls of the chamber having a helical ramp facing the orifice. The removable plug comprises a head and a substantially cylindrical stem extending from the head with the surface of the stem having a helical ramp facing away from the plug head and adapted to be rotatably slid upon the chamber helical ramp upon insertion of the plug into the receptacle chamber. Frictional engagement means are also provided for holding the plug in the receptacle upon insertion therewithin.

BRIEF DESCRIPTION OF THE DRAWING

FIG. 1 is an exploded view, partly in cross-section, of a receptacle and plug embodying principles of the present invention in one form.

FIG. 2 is an exploded elevational view in cross-section of a portion of the receptacle and of the plug shown in FIG. 1.

FIG. 3 is an elevational view in cross-section of the apparatus shown in FIG. 1 with the plug shown seated within the receptacle.

FIG. 4 is a fragmentary view in cross-section of a portion of the receptacle shown in FIG. 2 taken along lines 4—4.

FIG. 5 is a plan view in cross-section of the receptacle and plug shown in FIG. 3 taken along lines 5—5.

DETAILED DESCRIPTION OF THE DRAWING

Figure 6:
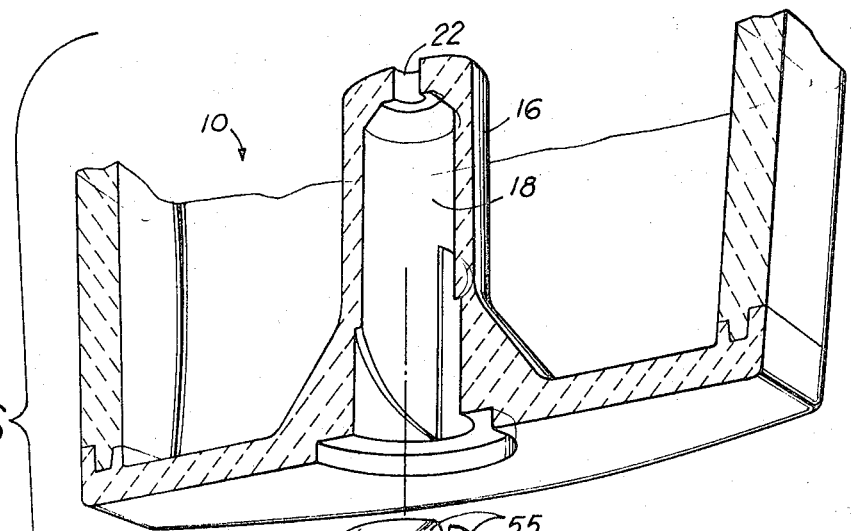
FIG. 6 is an exploded view partly in cross-section of a receptacle and removable plug embodying principles of the present invention in another form.

Referring now in more detail to the drawings, there is shown in FIG. 1 a receptacle 10 and a plug 11 each of which embodies the principles of the invention in one preferred form. This particular reservoir constitutes portions of a gas fueled lighter of the type which may be carried on one's person and used to ignite cigarettes or other objects. It should of course, be fully understood that the reservoir and plug may be used in innumerable devices other than gas filled lighters and the like.

The reservoir here comprises a hollow body 12 and a generally disc shaped base 14 secured thereto having a planar exterior surface 15 and a tube 16 formed integrally with the base, projecting inwardly into the void defined by the receptacle body and base. The interior cylindrical walls 18 of the tube define a chamber which communicates to the exterior of the receptacle through a counter-sunk orifice 20 in base surface 15. A port 22 is provided in the opposite end of tube 16.

As may also be seen by reference to FIG. 2, two helical ramps 24 and 25 project circumferentially inwardly along the surface walls 18 with axial extending projections of the ramp 27 formed therein adjacent orifice 20. Two substantially straight ramps 30 extend longitudinally along walls 18 linking the ends of the helical ramps. Two confronted ribs 33 extend inwardly into the chamber from walls 18 adjacent port 22.

In operation the void between tube 16 and the receptacle body and base is used to contain liquified butane which, under confinement at room temperature, is pressurized. An unshown, spring loaded valve disposed within the void seals the end of port 22 thereby preventing liquified butane confined therewithin from escaping to the exterior of the receptacle. The chamber defined by walls 18 within the tube 16 is adapted to receive the stem portion of a butane refill container upon consumption of the butane housed within the receptacle. Manual depression of the top of this refill container stem against the conical bottom walls 35 of tube 16 forces open a valve in the refill container while at the same time a forwardly projecting portion of the stem enters port 22 and opens the unshown valve within the receptacle. This coincident opening of the two valves allows the replenishment butane in the refill container to flow into the reservoir receptacle.

When the replenishment operation just described is not being performed it is desirable to plug orifice 20 to prevent lint or other particulated contaminents or the like from entering the cylindrical chamber of the receptacle. Were such contaminents permitted entry they may collect about the valve adjacent port 22 thereby causing valve leakage. To prevent such entry of extrinsic contaminents a plug 11 is provided having a tubular stem 38 extending from a flanged head 40 which head has a driving slot 41 formed therein. About the periphery of the tubular stem are provided two helical ramps 43 and 44 having the same pitch as that of the helical ramp formed along the walls 18 of the receptacle chamber. As in the case of the chamber helical ramps the periphery of stem 38 is provided with two substantially straight ramps 46 which extend longitudinally along the outer surface of the stem between helical ridges 43 and 44. Similarly, two axial extending projections of the ramps 48 and 49 are also provided at the end of the helical ramps adjacent end portion 50 of stem 38. Both the stem and flanged head of plug 11 here is formed of a resilient material such as plastic as also is the receptacle in this embodiment.

In operation, end portion 50 of plug 11 is axially aligned with orifice 20 and inserted into the receptacle chamber. As insertion proceeds the axial extending projections of the ramp 48 and 49 of the plug are brought into engagement with helical ramps 24 on the chamber walls, and similarly the axial extending projections 27 of the chamber engage the helical ramps of the plug. Upon engagement the plug is forced to rotate upon continued insertion until flanged head 40 is positioned closely adjacent orifice 20 at which point end portion 50 of the stem engaged rib 33. The plug may now be securely lodged within the receptacle by manually depressing the head 40 into countersunk orifice 20. This action causes still further insertion of the plug bringing end portion 50 thereof into pressure contact with ribs 33 whereupon the resilient end portion is deformed thereby into an out of round configuration as shown in FIG. 5.

With the stem portion of the plug now fully inserted within the cylindrical chamber with end portion 50 compressed radially against ribs 33, the plug is inhibited from exiting the chamber through frictional engagement. At this fully inserted position, the flanged head portion of the plug resides in the counter-sunk orifice within the surface of the receptacle base. When it becomes desirable to remove the plug a thumb nail or coin edge may be inserted into driving slot 41 of the flanged head portion of the plug and rotated counter-clockwise. As the frictional engagement between the plug and receptacle is only along a relatively small portion of the confronting surfaces between the plug and receptacle chamber walls the flanged head is easily turned. Once end portion 50 of the plug stem departs ribs 33 the plug is free to fall out rotatably from the cylindrical chamber. Where the plug and receptacle are inverted from that position depicted in the drawing, the plug may be rotated upwardly until projections 48 engage projections 27. This engagement of the projections momentarily breaks the continuity of rotation thereby signalling the manipulator that the top of the ramps has been reached whereupon the manipulator may axially extract the remaining portion of the plug from the chamber. Without such signal, the manipulator may cause further rotation of the plug whereupon the plug would be free to reenter the cylindrical chamber by gravitational action until confronting helical ramps were again engaged. Conversely, the substantially straight steps extending longitudinally along walls 18 and along stem 38 serve to prevent overtightening of the plug within the receptacle. If desired, the overhanging planar surface of the flanged head and of the planar surface of orifice 20 may also serve to limit such over-tightening.

Figure 7:
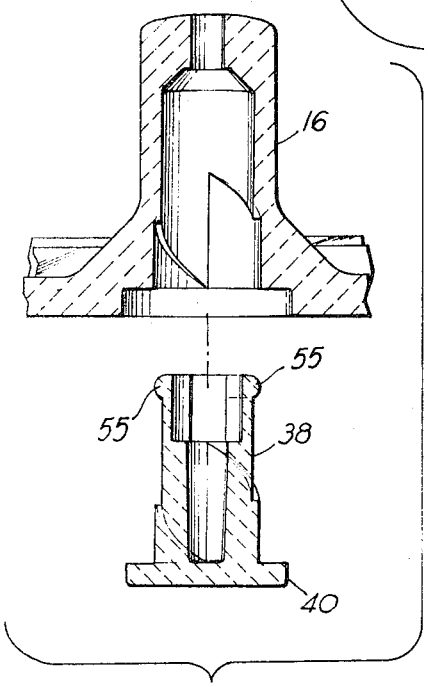
FIG. 7 is an exploded elevational view in cross-section of the receptacle and plug shown in FIG. 6.
Figure 8:
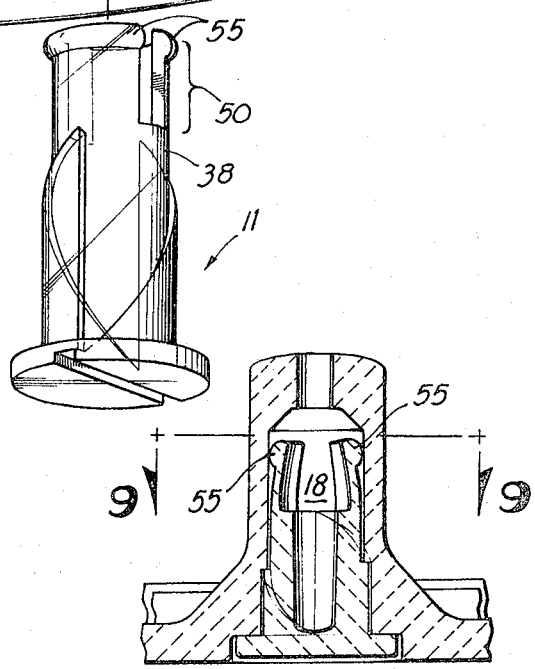
FIG. 8 is an elevational view in cross-section of a portion of the receptacle shown in FIG. 6 with the plug shown seated therewithin.
Figure 9:
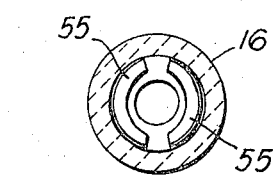
FIG. 9 is a plan view in cross-section of the receptacle and plug shown in FIG. 8 taken along the line 9—9.

Referring now to FIGS. 6 through 9 an alternative embodiment of the invention is shown in which the receptacle again forms a component of a gas filled lighter. The receptacle and plug of this embodiment is identical to that shown in FIGS. 1 through 5 with the exception of the frictional engagement means employed and the axial extending projections of the ramps. From this embodiment it will be noted that the cylindrical walls 18 of the tube 16 do not include the ribs 33 shown in the previous embodiment adjacent port 22. It will also be noted that the end portion 50 of the plug stem 38 is bifurcated and includes two circumferential ridges 55 at the end of the stem. Upon insertion of the plug into the cylindrical chamber provided by receptacle 10, ridges 55 engage and are pressed against cylindrical walls 18 in establishing frictional engagement between the plug and receptacle.

The just described receptacles and plugs may be manufactured in a very economical manner. For example, it will be noted that each may be formed of non-metallic materials. Neither the receptacles nor plugs need include screw threads which ordinarily require the use of rotating core and split molding techniques to produce. It will also be noted that the components of the receptacle shown in each embodiment may be linearly extracted from the molding apparatus employed due to the absence of component surfaces facing the direction of removal. The absence of such restricting surfaces in the plug shown in FIGS. 1 through 5 render it likewise linearly removable from a forming mold.

The plugs shown in the drawing may be inserted into their mating receptacle chambers with great manual facility. For example, the plug head may be first set upon a supporting surface with the plug stem extending vertically and the receptacle then placed thereupon in any rotational position relative to the orientation of the plug. Upon insertion the helical ramps of the plug engage those projecting from the chamber walls of the receptacle thereby imparting rotation to the plug. Once frictional engagement is established between the end of the plug stem and the chamber walls the plugged receptacle may be removed from the supporting surface. If desired, the head of the plug may then be more fully depressed into the countersunk orifice. Overtorquing of the plug within the chamber is prevented by the inclusion of the longitudinal steps. For removal a fingernail may be inserted into the drive slot within the plug head and rotated until the frictional engagement means are disengaged whereupon the plug may slide freely out of the chamber.

In the illustrated embodiments both the plug and the chamber of each illustrative embodiment includes two ramps. It should, of course, be understood that only one ramp may be provided in lieu of two. The two ramps shown in the illustrated embodiments are preferred however for force balancing purposes, that is to prevent misalignment and jamming. More than two ramps may be utilized if desired. It should also be understood that though helical ramps have been provided on both chamber walls and upon the plug stem, such is not mandatory inasmuch as the ramps on either the plug or on the chamber walls may be substituted by other camming surface shaped projecting from the walls of the chamber or plug such as a rounded peg or the like. Many other modifications and additions may, of course, be made to either the receptacle or to the plug without departure from the spirit and scope of the invention as set forth in the following claims.

I claim:

1. A receptacle and removable plug combination wherein the receptacle comprises a body having a substantially cylindrical chamber extending from an orifice in an external surface of said body and with the walls of said cylindrical chamber having a chamber helical ramp facing said orifice; wherein the removable plug comprises a head and a substantially cylindrical stem extending from said head with the surface of said cylindrical stem having a stem helical ramp facing away from said head adapted to engage and rotatably slide upon said chamber helical ramp upon insertion of the plug into the receptacle chamber; and wherein said combination further comprises frictional engagement means for holding the plug within the receptacle upon insertion therewithin.

2. A receptacle and removable plug combination in accordance with claim 1 wherein said receptacle chamber walls have a plurality of chamber helical ramps facing said orifice and at least one substantially straight chamber step extending between adjacent chamber helical ramps; and wherein said plug cylindrical stem surface has a plurality of stem helical ramps facing away from said head and at least one substantially straight stem step extending longitudinally between adjacent stem helical ramps.

3. A receptacle and removable plug combination in accordance with claim 1 wherein said chamber helical ramp has an axial extending projection of the ramp adjacent said orifice, and wherein said stem helical ramp has axial extending projection adjacent an end portion of said stem helical ramp.

4. A receptacle and removable plug combination in accordance with claim 1 wherein at least a portion of said plug stem is resilient, and wherein said frictional engagement means includes a rib projecting inwardly into said chamber from said chamber walls whereby upon insertion of the plug into the receptacle the resilient portion of the plug stem may be brought into contact with and deformed by the rib thereby compressing a portion of the plug stem radially against the rib.

5. A receptacle and removable plug combination in accordance with claim 1 wherein an end portion of said plug stem is resilient and includes a bifurcated end forming a portion of said frictional engagement means.

6. A receptacle adapted to be closed at one end by a plug having a head and a resilient cylindrical stem from the side of which a camming surface projects, said receptacle comprising a body having a substantially cylindrical chamber bounded by chamber walls extending to an orifice in the body surface with the chamber walls having a helical ramp facing said orifice, whereby upon insertion of the plug stem into the chamber the plug camming surface engages the helical ramp causing the plug to rotate upon further insertion.

7. A receptacle in accordance with claim 6 further comprising at least one rib projecting inwardly into said cylindrical chamber from said chamber walls to provide frictional engagement means for compressing the plug stem radially against a portion of the receptacle.

8. A receptacle in accordance with claim 6 wherein said chamber walls have a plurality of helical ramps facing said orifice and at least one substantially straight step extending longitudinally between adjacent helical ramps.

9. A receptacle in accordance with claim 6 wherein said helical ramp has an axial extending projection of the ramp adjacent the said orifice.

10. A removable plug adapted to be inserted into a receptacle having cylindrical walls bounding a chamber from which walls a camming surface projects, said removable plug comprising a head and a substantially cylindrical stem extending from said head with the surface of said cylindrical stem having a helical ramp facing away from said head, whereby upon insertion of the plug stem into the receptacle chamber the plug helical ramp engages the chamber camming surface causing the plug to rotate.

11. A removable plug in accordance with claim 10 wherein the surface of said cylindrical stem has a plurality of helical ramps facing away from said head and at least one substantially straight stem step extending longitudinally between adjacent helical ramps.

12. A removable plug in accordance with claim 10 wherein said helical ramp has an extending projection of the ramp adjacent an end portion of said stem helical ramp.

* * * * *